July 23, 1974  E. F. H. B. HILLIER ET AL  3,825,643
PRODUCTION OF SHAPED ARTICLES
Filed April 30, 1971  2 Sheets-Sheet 2

EDWARD F. H. B. HILLIER
ANTHONY ROGER HOLMES
INVENTORS

BY Young & Thompson
ATTORNEYS

United States Patent Office 3,825,643
Patented July 23, 1974

3,825,643
PRODUCTION OF SHAPED ARTICLES
Edward Francis Herbert Benjamin Hillier, Cheltenham, and Anthony Roger Holmes, Haslemere, England, assignors to Dowty Seals Limited, Tewkesbury, Gloucestershire, England
Filed Apr. 30, 1971, Ser. No. 138,872
Claims priority, application Great Britain, May 20, 1970, 24,317/70
Int. Cl. B29b 7/00; B29d 7/02
U.S. Cl. 264—161
4 Claims

ABSTRACT OF THE DISCLOSURE

A method for the production of a shaped article using an open mould in which an article-shaping cavity in the mould is filled with a pasty material includes distributing pasty material, over a part at least of the surface of the mould adjacent to and from which the cavity extends, by pressing a foraminous material against the said part of the surface and then removing the foraminous material, enabling the pasty material on the surface to flow to form a thin layer which is joined to the material in the cavity and which has a sufficient strength after setting to allow the article to be pulled from the cavity by pulling the layer, setting the pasty material, and removing the article from the cavity by pulling the layer of material on the surface, to which the article is attached, away from the surface.

---

Figure 1:
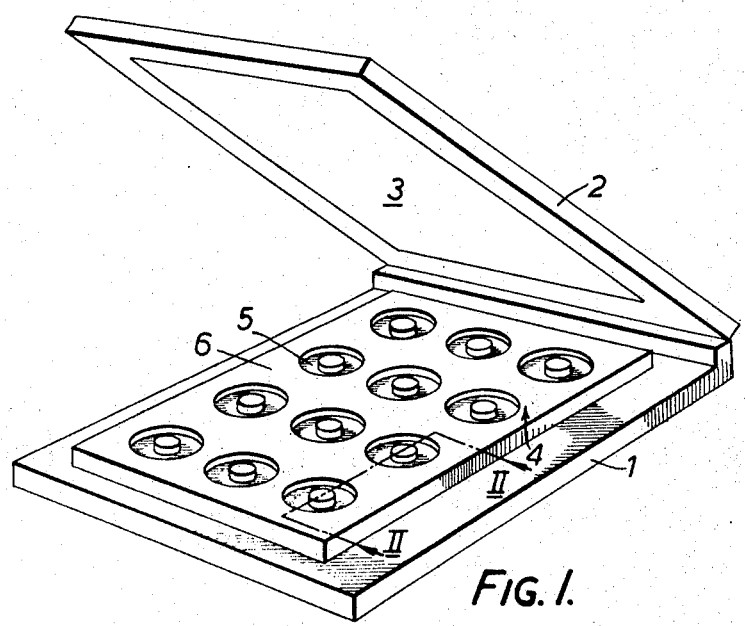

This invention relates to the production of shaped articles.

In producing shaped articles it is customary to use a mould having one or more article-shaping cavities extending from a surface thereof. Material in a "flowable" state, and which subsequently has to be cured or hardened (hereinafter referred to as "set"), fills the cavities. The setting operation may be effected in either of two ways.

According to the first, which may be called a "closed-mould" process, the flat surface of an upper plate is placed on top of that surface of the mould from which one or more mould-shaping cavities extend. Setting of the material is effected with the mould so closed.

According to the second way, which may be regarded as an "open-mould" process, no upper plate is used and setting is effected with the cavity or cavities open at the top.

In both processes the mould surface is of such a nature that a set article does not become bonded to the mould during the setting operation; this being by virtue of the material from which the mould is made or by suitable treatment of the mould surface prior to the moulding operation. Removal of a set atricle from its mould can be effected relatively easily in the first process, i.e. the closed mould process, for a small amount of material in the mould is squeezed from the mould during closing thereof and this forms a discontinuous thin layer between the mould surfaces around the mouth of the mould. When set, this layer or "flash" as it is usually called is adjacent and connected to the material in the mould. This "flash" can be used to pull the article from the mould and is subsequently removable from the article by any conventional flash removing technique. In the second process, i.e. the open mould process, no "flash" is formed since the material in the mould is not squeezed and consequently removal of the set article from the mould is not easy.

It is an object of this invention to provide an improved method of producing shaped articles using an open mould.

In accordance with the present invention a method for the production of a shaped article using an open mould in which the article-shaping cavity in the mould is filled with a pasty material includes distributing pasty material, over a part at least of the surface of the mould adjacent to and from which the cavity extends, by pressing a foraminous material against the said part of the surface and then removing the foraminous material, enabling the pasty material on the surface to flow to form a thin layer which is joined to the material in the cavity and which has a sufficient strength after setting to allow the article to be pulled from the cavity by pulling the layer, setting the pasty material, and removing the article from the cavity by pulling the layer of material on the surface, to which the article is attached, away from the surface.

The term "pasty" as used herein refers to a liquid having such viscous and thixotropic properties as to provide only a limited capacity for flow.

The mould may have a plurality of article-shaping cavities and not only will the cavities be filled with pasty material but also at least parts of the surface of the mould will have a thin layer of distributed pasty material so that after setting the plurality of shaped articles will be interconnected by the set layer of material.

After removal from the base member, the articles are subjected to a tumbling, barreling or similar operation to remove therefrom the material connected thereto and which can be regarded as the "flash" produced in a conventional closed-mould process.

The pasty material may include a "blowing" agent so that, during setting, the material will attain an expanded condition. This can provide an article having an exposed surface (when the article is in the shaping cavity) which is convexly curved, rather than flat, after setting.

The pasty material may include a solvent, evaporable during hardening to reduce the volume of the material. This step will cause the surface of the moulded article lying in the plane of the surface of the mould to acquire a concave shape.

One suitable foraminous material is a woven fabric such as is used in an orthodox screen-printing operation.

With such a woven fabric the screen may be placed slightly above the surface of the mould and the pasty material may be deposited in the cavity or cavities and over the required part or parts of the surface by forcing it through the screen, from the upper surface of the screen, by drawing a squeegee or similar implement over and forcing it into contact with the upper surface of the mould. In the case of a deep cavity or cavities several passes of the squeegee may be required.

Alternatively, with such a woven fabric the cavity or cavities may be filled or even over-filled with pasty material, and the part or parts of the surface covered with pasty material. The screen is then positioned just above the mould surface and the squeegee is drawn across the upper surface of the screen, to force it into contact with the surface of the mould. This has the effect of removing any surplus pasty material from the cavity or cavities and the surface of the mould, whereby the necessary thin layer of material is subsequently obtained.

The step of setting the pasty material may be effected by directing a hot air blast on to the surface of an article and the layer of pasty material located on the surface of the mould. Such a hot air blast may tend to reduce the thickness of the layer at its junction with the moulded article and hence facilitate the subsequent tumbling operation or the like.

Figure 2:
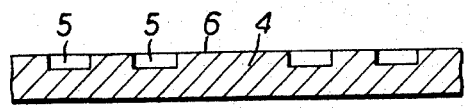
Figure 3:
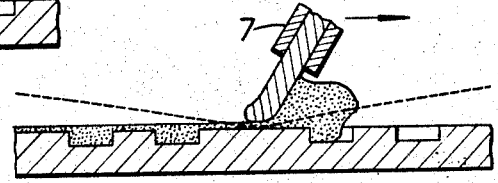
Figure 4:
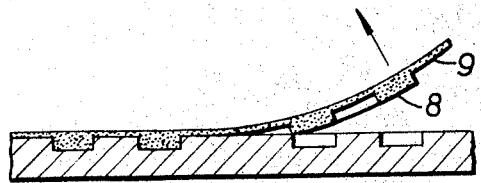
Figure 5:
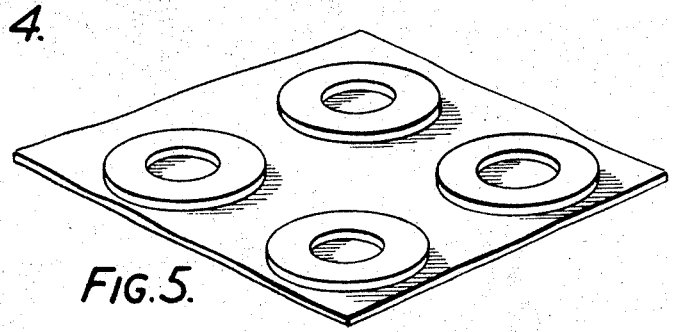
Figure 6:
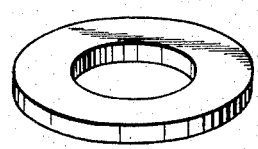
Figure 7:
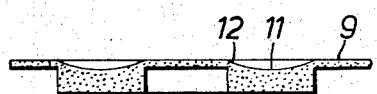
Figure 8:
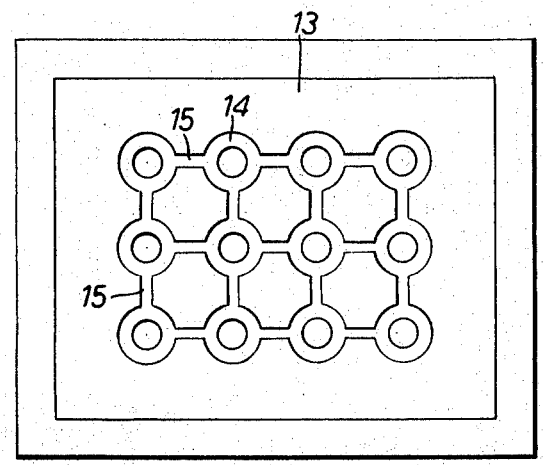
Figure 9:
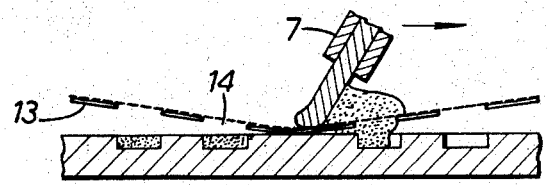
Figure 10:
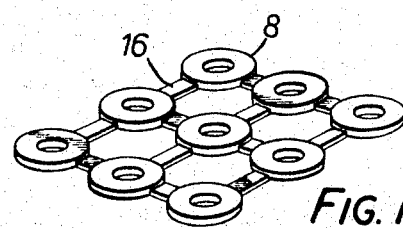

Two embodiments of the invention will now be particularly described with reference to the accompanying drawings, in which FIG. 1 shows the moulding apparatus diagrammatically, FIG. 2 is a cross-section taken on the line II—II of FIG. 1, FIG. 3 is a scrap view showing pasty material being forced through the interstices of the screen, FIG. 4 is a scrap view showing removal of the set articles and layer from the base member, FIG. 5 is a scrap view of the removed layer and articles, FIG. 6 shows one of the articles after the set layer has been removed therefrom, FIG. 7 shows a cross-section through part of the removed sheet of FIG. 5, FIG. 8 shows a plan view of the screen for the use with the FIG. 1 apparatus, FIG. 9 is a scrap view showing pasty material being forced through the stencil of FIG. 8, and FIG. 10 shows the hardened articles and layer joining them after removal from the base member having the FIG. 8 stencil.

Referring initially to FIG. 1, a bolster 1 has a frame 2 hingedly mounted in one edge thereof, the frame carrying a foraminous sheet 3 formed of woven nylon filaments. For convenience the foraminous sheet 3 will be referred to as a screen. A mould or base member 4 is mounted on the bolster 1 and within the base member 4 are formed a plurality of cavities 5. Each cavity 5 is in the form of an annular recess which opens directly into the upper surface 6 of the base member 4. Each of the cavities 5 is intended to produce moulded articles in the form of a sealing ring as shown in FIG. 6. In the FIG. 1 embodiment, the base member 4 is formed of aluminium.

Pasty materials which may be used in the method of moulding according to the invention require to have certain properties of viscosity or thixotropy so as to be capable of a limited amount of flow under the action of surface tension and gravity. Examples of two kinds of pasty material are as follows:

EXAMPLE 1

| Material: | Parts by weight |
| --- | --- |
| Polyvinyl chloride polymer | 100 |
| Barium/zinc stabiliser | 2–5 |
| Plastisiser | 60–100 |
| Surface active agent (silicone) | 0.5–2 |
| Pigment | 0.5–1 |
| Blowing agent (optional) | 0.5–10 |
| Solvent (optional) | 0.5–10 |

EXAMPLE 2

| Material: | Parts by weight |
| --- | --- |
| Epoxy resin | 100 |
| Hardener | 40–60 |
| Fillers (thixotropic) | 0–20 |
| Surface active agent | 0.5–1 |
| Pigment | 0.5–1 |

| Material | Parts by weight |
| --- | --- |
| Internal release agent | 0.5–5 |
| Blowing agent (optional) | 0.5–3 |
| Solvent (optional) | 0.5–10 |

In carrying out the invention the screen 3 in the FIG. 1 apparatus is pressed down on to the surface 6 of the base member 4 and pasty material according to either example is spread over the screen by means of a squeegee 7 (see FIG. 3). The action of the squeegee is to force the pasty material through the screen and into the cavities 5 and also to scrape the pasty material from the surface of the screen leaving the holes within the screen filled with the pasty material which rests on the surface. The screen is then raised leaving the cavities filled with the pasty material and a large number of small quantities of pasty material distributed over the surface 6 because of the material in the holes of the screen preferring to remain on the base when the screen is raised.

For the setting process, particularly for the pasty material of the first example, the base member 4 is placed into a hot air blast oven, hot air being arranged to flow towards the surface 6 of the base member. Initially the heating will reduce the viscosity of the pasty material, enabling it very quickly to form a layer over the surface 6. The layer would form normally in the course of time but it is accelerated in the hot air blast. In a predetermined time the heating action will harden the pasty material and the base member is then removed from the oven. The moulded articles may be simply removed as a sheet by pulling on the layer 9 of hardened material on the surface 6 of the base member, the moulded articles 8 (see FIG. 4) coming away with the hardened layer 9 from their cavities. Without the hardened sheet 9 the moulded articles would be quite difficult to remove from their cavities without using for example a pointed tool which could damage the rings.

Where the pasty material has included in it the optional solvent, a degree of shrinking of the material occurs during the hardening process causing a concave surface 11 to form at the position where the moulded article joins the surface 6 of the base member 4. This concave surface also helps to provide a slightly thinner attachment web 12 between the layer 9 and the moulded article 8 making removal of the article from the layer 9 more simple.

Removal of the layer 9 from the moulded article 8 is accomplished by tumbling in a conventional manner. Initially the whole moulded sheet comprising the layer 9 and the articles 8 is roughly crumpled into a compact mass and frozen by the application of liquid nitrogen or carbon dioxide. It is then placed in a barrel and pelted with abrasive particles which very quickly remove the moulded articles 8 from the layer 9, leaving no objectionable flash on the articles. After tumbling the articles are then ready for use.

If it is desired that the surface of the moulded article lying in the mould opening in the surface 6 should have a convex form, then a blowing agent would be used in the pasty material in substitution for the solvent.

The method of moulding described for FIG. 1 may be altered slightly in order to speed up the whole process. The change in the steps of operation is firstly to apply the pasty material directly into the cavities 5, filling the cavities to over-flowing. The screen 3 is then placed down on to the surface of the base member 4 and the squeegee 7 is scraped over the surface of the screen. The surplus material is then forced upwardly through the screen and distributed smoothly over the screen in the holes therein, any surplus material being removed from the surface of the screen leaving all holes filled. The steps then follow exactly as previously described. Where the moulds are of substantial size this will clearly save time in the actual process.

Reference is now made to FIGS. 8, 9 and 10. FIG. 8 shows a stencil which is intended to be secured on the underside of the screen 3 in FIG. 1. This stencil is formed of a thin impervious sheet 13 having a series of openings cut therein comprising annular openings 14 corresponding to the openings of the moulds into the surface 6 and connecting channels 15 joining the openings 14 together. The openings 14 and 15 define the zones through which pasty material may pass through the screen. When the pasty material has been applied through the screen, as shown in FIG. 9, by means of a squeegee 7 the screen is removed and there is left on the surface 6 a number of areas having a large number of small quantities of pasty material corresponding to the interstices of the screen, these areas generally forming strip like layers which interconnect the openings of the cavities 5. By allowing time and/or inserting the moulds into the hot air blast oven the discrete quantities will join together forming thin strip like layers of pasty material which eventually hardens. FIG. 10 illustrates the form of the hardened sheet which is removed from the moulds, the stripping from the moulds being substantially as explained with reference to FIG. 4. The articles 8 may then be removed from the connecting strips 16 by tumbling substantially as described with reference to the previous embodiment.

Inserts of metal or other material may be fitted into the moulds for bonding to the moulded articles during hardening operation.

We claim:

1. A method for the production of shaped articles, using an open mould in which a plurality of article-shaping cavities in the mould are filled with a liquid material the viscous and thixotropic properties of which provide only a limited capacity for flow, including supporting foraminous material above the surface of the mould, depositing said liquid on said foraminous material, pressing an implement against said foraminous material to force said foraminous material into contact with only a portion of the surface of the mould and moving the pressed implement over the foraminous material so that said contact portion moves along the surface of the mold to force liquid material through the foraminous material to control the filling of cavities with liquid material and also to leave on the surface of the mould discrete amounts of liquid material from the interstices of the foraminous material returns to its position above the surface of the mould, which discrete amounts flow to form a thin layer of liquid material joined to the liquid material in the mould cavities, setting the liquid material with the liquid material exposed so that the mould is open, removing the articles from the cavities by pulling the thin set layer, to which the articles are attached, away from the surface, and thereafter separating the articles from the layer.

2. A method according to claim 1, wherein the foraminous material is a woven fabric.

3. A method according to claim 1, wherein the liquid material is forced through the foraminous material from the upper surface thereof.

4. A method according to claim 1, which includes the use of a stencil of thin impervious sheet material associated with the foraminous material to limit the area of the said surface of the mould over which the layer of liquid material may be deposited.

References Cited

UNITED STATES PATENTS

| | | | |
|---|---|---|---|
| 2,865,046 | 12/1958 | Bird | 264—257 X |
| 949,863 | 2/1910 | Traeber et al. | 264—257 X |
| 2,822,573 | 2/1958 | Wasniewski et al. | 264—257 |
| 1,111,802 | 9/1914 | Moomy | 264—257 |
| 2,380,653 | 7/1945 | Kopplin | 264—161 X |
| 2,908,936 | 10/1959 | Kilborn | 264—DIG. 034 |
| 3,584,090 | 6/1971 | Parrish | 264—45 |
| 1,936,675 | 11/1933 | Kessler | 118—504 X |
| 2,502,926 | 4/1950 | Chadwick et al. | 264—264 X |
| 3,158,669 | 11/1964 | Greenlie et al. | 264—153 |
| 2,952,376 | 9/1960 | Orloff | 156—497 |
| 2,997,098 | 8/1961 | Riese et al. | 156—497 |
| 1,546,834 | 7/1925 | Hanington | 101—122 X |
| 2,064,284 | 12/1936 | Wulf | 101—126 |
| 2,276,181 | 3/1942 | Foster | 101—122 X |
| 3,658,977 | 4/1972 | Baker | 264—259 |

OTHER REFERENCES

Randolph et al.: Plastics Engineering Handbook, Reinhold, New York (1960), p. 501 relied on.

ROBERT F. WHITE, Primary Examiner

W. E. HOAG, Assistant Examiner

U.S. Cl. X.R.

264—214, 297, 334